United States Patent [19]

Casebolt

[11] Patent Number: 5,174,410
[45] Date of Patent: Dec. 29, 1992

[54] SHOCK ABSORBER SAFETY SYSTEM FOR WORKERS AND METHOD OF MAKING SAME

[75] Inventor: Scott C. Casebolt, North St. Paul, Minn.

[73] Assignee: DB Industries, Inc., Red Wing, Minn.

[21] Appl. No.: 706,278

[22] Filed: May 28, 1991

[51] Int. Cl.⁵ .............................................. A62B 35/00
[52] U.S. Cl. .......................................... 182/3; 188/371
[58] Field of Search ............................ 182/3, 4, 5, 6, 7; 297/470, 471, 472; 188/371

[56] References Cited

U.S. PATENT DOCUMENTS

| | | | |
|---|---|---|---|
| 2,352,036 | 6/1944 | Tauty | 297/472 X |
| 2,474,124 | 6/1949 | Schultz | 188/371 X |
| 2,613,865 | 10/1952 | Rose | 182/3 |
| 3,444,957 | 5/1969 | Ervin | 182/3 |
| 3,804,698 | 4/1974 | Kinloch | 182/3 X |
| 4,100,996 | 7/1978 | Sharp | 182/3 |
| 4,446,944 | 5/1984 | Forrest | 182/3 |
| 4,538,702 | 9/1985 | Wolner | 182/3 |
| 4,618,026 | 10/1986 | Olson | 188/371 X |

FOREIGN PATENT DOCUMENTS

| | | | |
|---|---|---|---|
| 407838 | 3/1934 | United Kingdom . | |
| 2191560 | 12/1987 | United Kingdom | 182/3 |

Primary Examiner—Karen J. Chotkowski
Attorney, Agent, or Firm—Moore & Hansen

[57] ABSTRACT

The shock absorber disclosed herein includes an elongate strip of a webbed material or fabric. Both ends of the fabric are cut a short distance along the longitudinal axis of the strip of material, and then one end of the strip is twisted a half turn, or 180°. The two ends of the webbing are brought together, and the juxtaposed halves of the separate ends may then be folded back on themselves and sewn together to form a loop. One loop may now be fastened as by a safety hook to a worker's safety belt or harness, and the other end fastened as by a double locking snap hook to a rope or cable attached to a fixed structure such as a building or scaffolding. The excess length of webbing may be folded back onto itself until it fits compactly into a housing or casing. The housing or casing must be releasable so as not to interfere with the tearing action of the strip of webbing should the worker fall off the structure to which the shock absorber is attached.

14 Claims, 2 Drawing Sheets

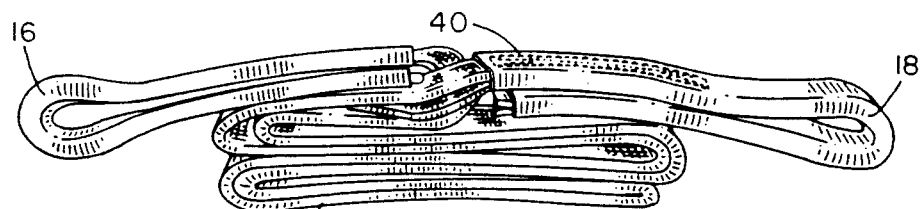
FIG. 5
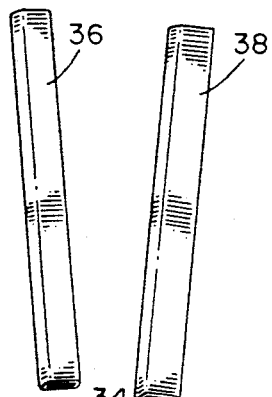
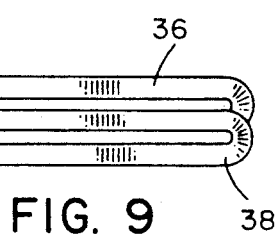
FIG. 9
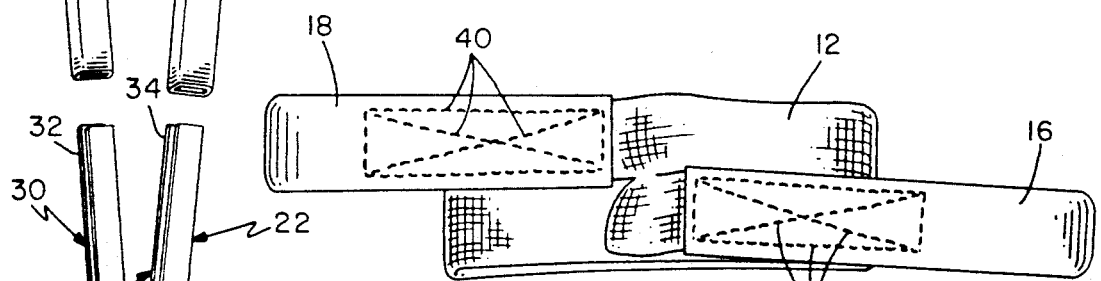
FIG. 6
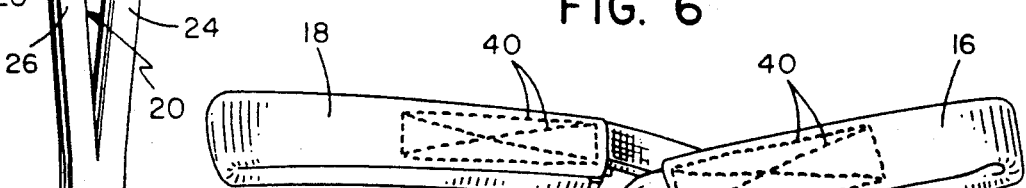
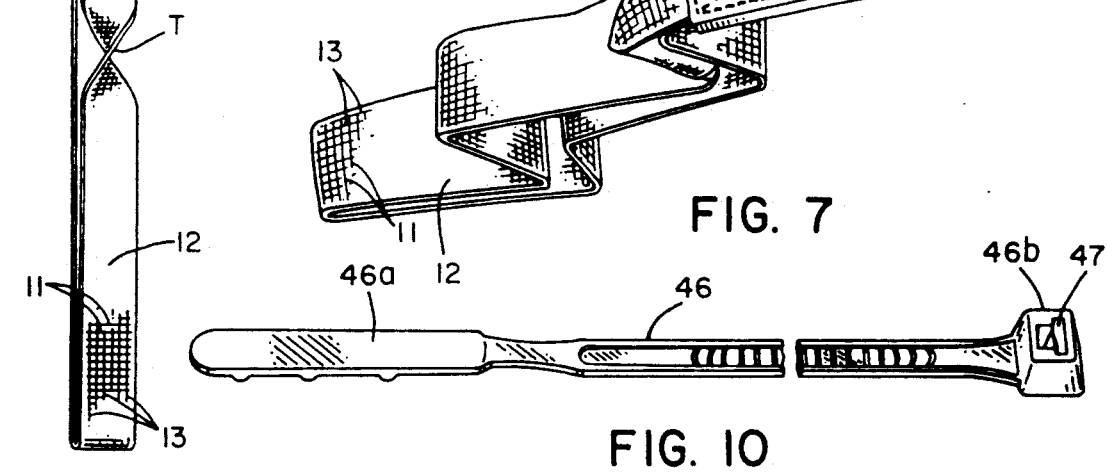
FIG. 7
FIG. 8
FIG. 10

SHOCK ABSORBER SAFETY SYSTEM FOR WORKERS AND METHOD OF MAKING SAME

BACKGROUND OF THE INVENTION

1. Technical Field

The present invention relates generally to shock absorbers for dissipating the kinetic energy of a falling object. More specifically, the invention relates to devices, designed for a single use, that slow and stop the fall of rapidly descending objects, such as free falling humans, fastened to a structure as by a rope or other tether. An energy absorber of this type may work, for example, by elongation, entailing the tearing or drawing out of some of its elements, thus limiting decelerating forces applied to the falling body.

2. Background Information

Many safety devices have been developed for braking the fall of objects from great heights. The present invention is most closely related to the type of shock absorber disclosed in U.S. Pat. No. 4,538,702, issued to Wolner on Sep. 3, 1985. Shock absorbers of this type are of relatively simple construction, relying on the tearing action of a fabric to overcome the momentum of the falling object and bring it to a safe stop, avoiding the likelihood of damage or injury arising from a sudden, jolting halt as when a falling object reaches the full extension of a rope or other tether. In other words, shock absorbers such as these cause controlled, rather than instantaneous, deceleration of a falling body to a stationary position.

The Wolner patent discloses the use of a piece of webbing that has been folded over onto itself several times, with a coil shaped pin inserted through the webbing. A light cover is then placed around the assembly. As the object to which an end of the fall protection device is attached falls, the pin tears the webbing, and the resistance from the webbing as it is being torn absorbs the energy of the falling body steadily decelerating it until it stops. In order for this device to function properly, the pin must be properly positioned and must not become dislodged or otherwise malfunction, since such a malfunction could result in serious injury or death to a human user.

Similarly, U.S. Pat. No. 4,446,944, issued to Forrest et al. on May 8, 1984, discloses a shock absorber having a plurality of energy absorbing straps of graduating lengths. It is intended that each of the shorter straps will break, the shortest being the first to break, the next longest being the second to break, and so on, each strap absorbing some of the kinetic energy of the falling body, until the falling body is brought to rest. In use, such a device has the potential of being damaging to a human user because of the sudden, jarring motions the falling body is subjected to as each of the straps is extended and then broken. Further, the Forrest et al. device must be carefully assembled since a plurality of straps are involved and the stitching or other means of fastening must be carefully placed to ensure proper functioning of the shock absorber.

The shock absorber safety system of the present invention overcomes the difficulties described above and affords other features and advantages heretofore not available.

SUMMARY OF THE INVENTION

The shock absorber disclosed herein is of extremely simple construction and requires the use of only a minimum of parts. Nevertheless, it is extremely safe and effective, relying on the use of appropriate materials. Due to its uncomplicated construction, it may be inexpensively produced, offering effective fall protection to many who may otherwise not rely on such a safety device because it may be offered at an affordable price.

The present invention includes an elongate strip of a webbed material or fabric. Both ends of the fabric are cut a short distance along the longitudinal axis of the strip of material, and then one end of the strip is twisted a half turn, or 180°. The two ends of the webbing are brought together, and the juxtaposed halves of the separate ends may then be folded back on themselves and sewn together to form a loop. One loop may now be fastened as by a safety hook to a worker's safety belt or harness, and the other fastened as by a double locking snap hook to a rope or cable attached to a fixed structure such as a building or scaffolding. The excess length of webbing may be folded back onto itself until it fits compactly into a housing or casing. The housing or casing must be releasable so as not to interfere with the tearing action of the strip of webbing should the worker fall off the structure to which the shock absorber is attached.

Other objects and advantages of the invention will become apparent from the following detailed description and from the appended drawings in which like numbers have been used to describe like parts throughout the several views.

BRIEF DESCRIPTION OF THE DRAWINGS

FIG. 5 is a side view of the invention without any shell or housing, showing how the finished webbing strip is folded and arranged before affixing the shell;

FIG. 6 is a top view of the finished webbing shown in FIG. 5;

FIG. 7 is a perspective view of the finished webbing illustrating the fold locations before affixing the shell;

FIG. 8 is a plan view of the webbing before assembly of the end loop reinforcements;

FIG. 9 is a side view of the loop portions of the shock absorber during assembly; and FIG. 10 is a perspective view of a cable tie used to tighten the ends of the preferred embodiment of the shock absorber.

DESCRIPTION OF THE PREFERRED EMBODIMENT

Figure 1:
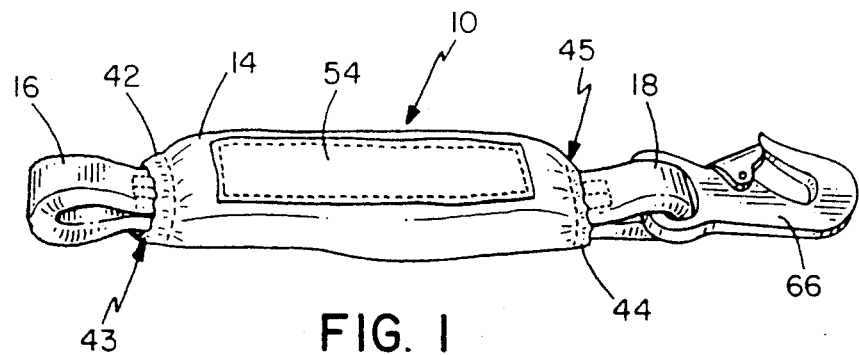
FIG. 1 is a perspective view of the present invention using a fabric shell and having a safety latch known as a double locking snap hook attached to a loop on an end thereof.
Figure 2:
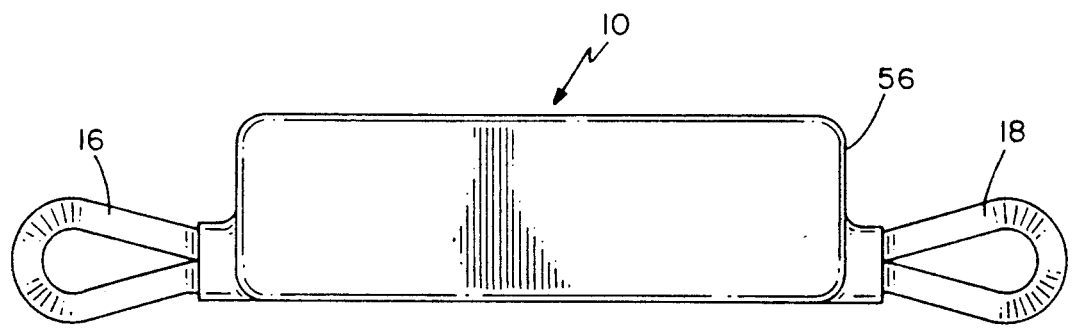
FIG. 2 is a side view of the present invention using an alternate flexible shell or housing.
Figure 3:
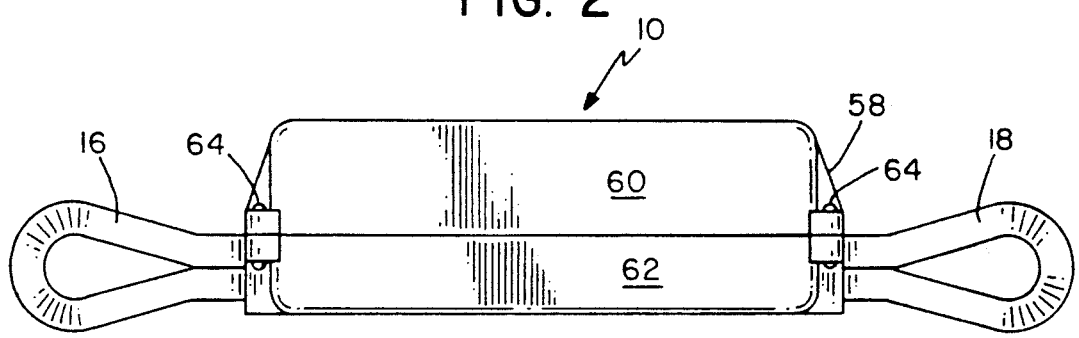
FIG. 3 is a side view of the present invention using a hard plastic shell or housing.

With reference to the drawings, and in particular to FIGS. 1-3, the shock absorber safety system of the present invention is generally indicated by reference numeral 10. Shock absorber 10 includes a strip of webbing 12, shown in FIGS. 5-8, enclosed in a housing or shell 14. As shall be shown, the ends of webbing 12 may be connected with or formed into attachment means such as first and second loop portions 16 and 18, respectively.

Webbing 12 is formed of a single strip of polyester webbing, preferably approximately 1-¾ inches wide and approximately 61 inches long. The webbing used is preferably a modification of webbing Type X, complying with MIL-W-4088. In the preferred embodiment of shock absorber 10, modifications to the Type X specification include the use of 15.5 picks per inch in webbing 12. Further, it is preferred that webbing 12 include nylon picks or lateral fibers 11 and polyester longitudinal fibers 13, as shown in FIG. 8. Pick yarns 11 preferably include five strands of 840 denier nylon fibers available under the DuPont 715 trademark.

As may be seen in FIG. 8, preparation of webbing 12 for use with shock absorber 10 is relatively simple. A first slit 20 is cut along the length of and approximately bisecting the first end 22 of webbing 12. A first end portion 24 and a second end portion 26 result from cutting first slit 20. A second slit 28 is then cut along the length of and approximately bisecting the second end 30 of webbing 12. A third end portion 32 and a fourth end portion 34 result from cutting second slit 28. In the preferred embodiment of shock absorber 10, first slit 20 and second slit 28 of webbing 12 are each cut approximately twelve inches long.

After cutting slits 20, 28, first end 22 of webbing 12 is twisted 180° with respect to second end 30, resulting in a twist T along the length of webbing 12. Webbing 12 is then folded in half, and first end 22 is laid over second end 30, resulting in the juxtaposition of first end 22 against second end 30. Consequently, first end portion 24 of first end 22 becomes juxtaposed against fourth end portion 34 of second end 30, and second end portion 26 of first end 22 becomes juxtaposed against third end portion 32 of second end 30. In the preferred embodiment, a first tubular nylon web 36 is positioned as by sliding over the juxtaposed second end portion 26 and third end portion 32, forming what will become first attachment means or loop portion 16. Similarly, a second tubular nylon web 38 is positioned as by sliding over the juxtaposed first end portion 24 and fourth end portion 34, forming what will become second attachment means or loop portion 18. First and second tubular webs 36, 38 have an outside diameter of preferably approximately 1-⅛ inches and a length of approximately twelve inches, the same as the length of first and second slits 20, 28. Tubular webs 36, 38 are so proportioned to fit snugly about their respective juxtaposed webbing portions. It should be noted that other covering means may be substituted for tubular webs 36, 38 while remaining within the spirit of the invention.

After positioning first and second tubular webs 36, 38, each member formed thereby is folded back onto itself in a direction opposite from that of the other, as illustrated in FIG. 9. Tubular webs 36, 38 are then sewn into position to form loop portions 16, 18, respectively. The stitching 40 used to form loop portions 16, 18 is shown in FIGS. 6 and 7.

In the preferred embodiment, webbing 12 is then scored and folded as illustrated in FIG. 7, preferably into lengths of approximately five inches each. Similarly, as is also shown in FIG. 7, first loop portion 16 is folded backward relative to second loop portion 18, resulting in first loop portion 16 and second loop portion 18 projecting in opposing directions. Webbing 12 is then compressed into the configuration shown in FIG. 5.

Figure 4:
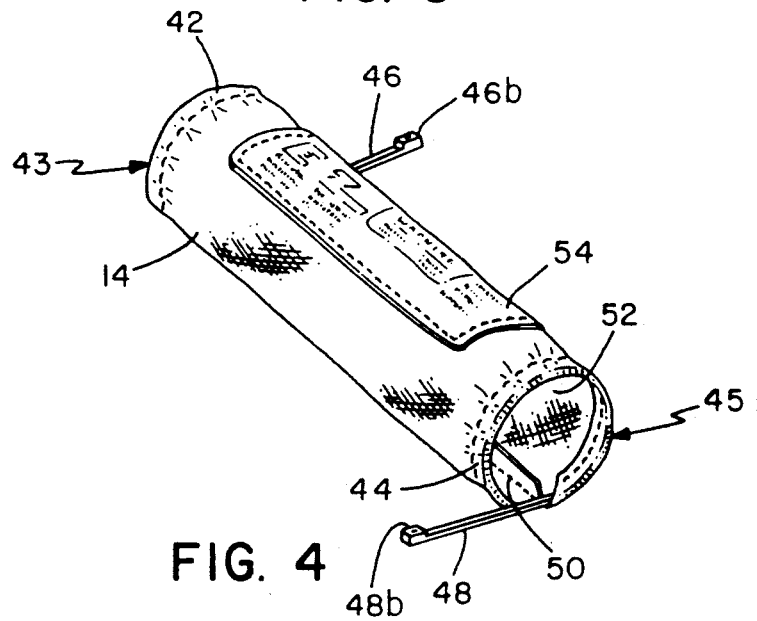
FIG. 4 is a perspective view of the fabric shell shown in FIG. 1, before assembly with the webbing strip.

Webbing 12, after being folded into the configuration shown in FIG. 5, is ready to be covered by a protective cover, such as shell 14, illustrated in FIG. 4, to protect the webbing and maintain it in its proper position for use. Shell 14 is formed into the generally cylindrical configuration illustrated from a sheet of material approximately eight inches in length by 6-¾ inches wide. Sewn into the two ends of shell 14 are first and second shell slots or channels 42, 44, into which may be slid first and second cable ties 46, 48, respectively, although other contractible fastening means may be utilized as long as they will remain fastened under normal working conditions but release in the event of the worker falling. First and second shell channels 42, 44 are located adjacent to first and second ends 43, 45, of shell 14, respectively. First and second cable ties 46, 48 are preferably approximately 7-½ inches long, and permit the secure fastening of shell 14 about webbing 12 to form shock absorber 10. FIG. 10 illustrates first cable tie 46, although first and second cable ties 46, 48 are identical in structure. Cable tie 46 includes a connector head 46b having an aperture 47. After positioning cable tie 46 in channel 42, as illustrated in FIG. 4, end 46a is passed through aperture 47 and pulled tight.

The two edges of the sheet of material used for shell 14 are sewn together as at shell seam 50 to form its generally cylindrical configuration. The material used for shell 14 is preferably 1000 denier CORDURA® nylon, to which a urethane coating is added to its inner side 52 to improve the water resistance of shell 14. Although waterproofing shell 14 as described will not completely eliminate water penetration to webbing 12 of shock absorber 10, it is helpful in reducing the amount of moisture accumulating within shock absorber 10. It is preferred that shell 14 include sewn thereto a label 54 that may include information concerning the shock absorber, including any warnings or special notices or instructions that may be required for proper and safe operation of the shock absorber.

The final step in assembling shock absorber 10 is enclosing webbing 12 within shell 14. Shell 14, with first and second cable ties 46, 48 inserted into first and second shell channels 42, 44, respectively, as illustrated in FIG. 4, is slid over webbing 12, which is folded as illustrated in FIG. 5. Once shell 14 is properly positioned about webbing 12, with first loop portion 16 projecting from shell first end 43 and second loop portion 18 projecting from shell second end 45, first and second cable ties 46, 48 may be tightened to reduce the diameter of shell first end 43 and shell second end 45, thereby restraining webbing 12 within shell 14 as shown in FIG. 1. Cable ties 46, 48 are used to restrain webbing 12 within shell 14 because they are secure and easy to use, requiring only that the first end thereof be placed through an opening in the second end. The first end is then pulled tight, and cable ties 46, 48 will then retain their secure relationship until shock absorber 12 is needed for fall protection of a worker wearing it. Other means for securing webbing 12 within shell 14 may be relied on instead of cable ties 46, 48, including sewing first and second ends 43, 45 of shell 14 to webbing 12. Whatever means is selected, it is important that webbing 12 can be released from shell or housing 14 upon the event of a worker falling.

Alternate embodiments are illustrated in FIGS. 2 and 3. Each of these embodiments differs from that illustrated in FIG. 1 only in their protective shells. Housing 56, illustrated in FIG. 2, is a pliable rubber shell. Housing 58, illustrated in FIG. 3, is a rigid plastic shell having first and second halves 60, 62, that may be hingedly connected (not shown) and fastened together as by plastic rivets 64.

In use, a worker performing a job at a great height fixedly attaches shock absorber 10 to a safety belt or harness worn by the worker by means of a fastening device, such as a releasable clip, attached to first loop portion 16. Second loop portion 18 has secured to it a latching device such as double locking snap hook 66, illustrated in FIG. 1. Snap hook 66 may then be fastened to a fixed object such as a safety rope or cable attached to the building or scaffolding on which the worker is working.

In the event that the worker should fall off the building or scaffolding, first and second cable ties 46, 48 will release as necessary and permit webbing 12 to be rapidly withdrawn or paid out from shell 14. Almost immediately upon falling, depending upon the amount of slack in any lead line or cabling to which snap hook 66 may be attached, webbing 12 begins to tear along the line already defined by slits 20, 28. This tear, generally bisecting webbing 12 along its longitudinal axis, continuously slows the worker's fall until the worker is brought to an controlled, gradual stop. The maximum deceleration distance a worker travels is limited to 37 inches by shock absorber 10. The slowing effect of webbing 12 is especially effective because of the double layer of webbing 12 that must be torn as the worker falls (see FIG. 7), and because of the resistance to tearing of nylon picks 11 of the webbing itself. Because of twist T along the length of webbing 12, should the worker have enough momentum that the tearing of webbing 12 does not absorb sufficient energy to stop the fall of the worker, twist T prevents webbing 12 from tearing any further, and will prevent the fall from continuing.

While the preferred embodiments of the invention have been described, it should be understood that various changes, adaptations, and modifications may be made therein without departing from the spirit of the invention and the scope of the appended claims.

What is claimed is:

1. A shock absorber for fall protection systems for workers working on high structures, comprising:
    at least one strip of webbing having first and second ends and longitudinal and lateral fibers, said first end including a first end portion and a second end portion defined by a first longitudinal split in said strip of webbing, and said second end including a third end portion and a fourth end portion defined by a second longitudinal split in said strip of webbing;
    a first attachment portion formed of said first end portion of said first end and said fourth end portion of said second end;
    a second attachment portion formed of said second end portion of said first end and said third end portion of said second end;
    a first attachment means fastened to said first attachment portion; and
    a second attachment means fastened to said second attachment portion, whereby said first attachment means is secured to the worker using the shock absorber and said second attachment means is secured to the structure on which the worker is working.

2. A shock absorber as described in claim 1, further comprising:
    a releasably attached housing containing said strip of webbing, said first and second attachment means protruding from said housing.

3. A shock absorber as described in claim 2, wherein:
    said housing is made of a fabric; and
    said housing is stitched to said first and second attachment means.

4. A shock absorber as described in claim 2, wherein said housing comprises:
    a first rigid portion; and
    a second rigid portion hingedly attached to said first rigid portion.

5. A shock absorber as described in claim 2, wherein:
    said housing is made of a fabric;
    said housing includes a first end and a second end;
    said first end of said housing includes a first channel portion and said second end of said housing includes a second channel portion; and
    a first contractible fastening means is contained in said first channel portion and a second contractible fastening means is contained in said second channel portion, whereby said strip of webbing will remain releasably contained within said housing upon contracting said first contractible fastening means and said second contractible fastening means.

6. A shock absorber as described in claim 2, wherein:
    said first attachment means projects from a first end of said protective casing and said second attachment means projects from a second end of said protective casing, said first end of said protective casing being opposed to said second end of said protective casing.

7. A method of making a shock absorber for fall protection systems from a strip of webbing, the strip of webbing having a first end and a second end, comprising the steps of:
    cutting a first slit along the length of and approximately bisecting the first end of the strip of webbing, forming a first end portion and a second end portion, and cutting a second slit along the length of and approximately bisecting the second end of the strip of webbing, forming a third end portion and a fourth end portion, said first slit and said second slit each extending along a fraction of the length of the strip of webbing;
    twisting the first end of the strip of webbing through a 180° turn with respect to the second end of the strip of webbing; and
    folding the strip of webbing in half so that the first end of the strip of webbing and the second end of the strip of webbing are juxtaposed against each other, with said first end portion of said first end juxtaposed against said fourth end portion of said second end, forming a first attachment means, and said second end portion of said first end juxtaposed against said third end portion of said second end, forming a second attachment means.

8. A method of making a shock absorber as described in claim 7, comprising the further step of:
    enclosing the strip of webbing, except at least a portion of said first attachment means and at least a portion of said second attachment means, in a protective casing.

9. A method of making a shock absorber as described in claim 8, comprising the further step of:
    folding the strip of webbing upon itself before enclosing it in said protective casing.

10. A method of making a shock absorber as described in claim 9, wherein:
said first attachment means projects from a first end of said protective casing and said second attachment means projects from a second end of said protective casing, said first end of said protective casing being opposed to said second end of said protective casing.

11. A method of making a shock absorber for fall protection systems from a strip of webbing, the strip of webbing having a first end and a second end, comprising the steps of:
cutting a first slit along the length of and approximately bisecting the first end of the strip of webbing, forming a first end portion and a second end portion, and cutting a second slit along the length of and approximately bisecting the second end of the strip of webbing, forming a third end portion and a fourth end portion, said first slit and said second slit each extending along a fraction of the length of the strip of webbing;
twisting the first end of the strip of webbing through a 180 turn with respect to the second end of the strip of webbing;
folding the strip of webbing in half so that the first end of the strip of webbing and the second end of the strip of webbing are juxtaposed against each other, with said first end portion of said first end juxtaposed against said fourth end portion of said second end, and said second end portion of said first end juxtaposed against said third end portion of said second end;
affixing said first end portion of said first end to said fourth end portion of said second end, forming a first attachment portion, and affixing said second end portion of said first end to said third end portion of said second end, forming a second attachment portion; and
connecting a first attachment means to said first attachment portion and connecting a second attachment means to said second attachment portion.

12. A method of making a shock absorber as described in claim 11, comprising the further step of:
enclosing the strip of webbing, except at least a portion of said first attachment means and at least a portion of said second attachment means, in a protective casing.

13. A method of making a shock absorber as described in claim 12, comprising the further step of:
folding the strip of webbing upon itself at least once before enclosing it in said protective casing.

14. A method of making a shock absorber as described in claim 13, wherein:
said first attachment means projects from a first end of said protective casing and said second attachment means projects from a second end of said protective casing, said first end of said protective casing being opposed to said second end of said protective casing.

* * * * *